United States Patent [19]
Krueger et al.

[11] Patent Number: 5,181,354
[45] Date of Patent: Jan. 26, 1993

[54] BARRIER PANEL

[75] Inventors: Robert A. Krueger; Michael K. Krueger, both of Shelby Township, Macomb County, Mich.

[73] Assignee: Tri-Mark Metal Corporation, Detroit, Mich.

[21] Appl. No.: 664,811

[22] Filed: Mar. 5, 1991

[51] Int. Cl.⁵ .............................................. E04H 9/16
[52] U.S. Cl. ...................................... 52/79.1; 52/273; 52/222; 52/731.2; 135/97; 160/395
[58] Field of Search ................. 52/63, 79.1, 79.5, 273, 52/74, 731, 222, 202; 160/395, 392, 388, 380; 135/97, 101, 106

[56] References Cited

U.S. PATENT DOCUMENTS

| | | | |
|---|---|---|---|
| 3,058,518 | 10/1962 | Housman | 160/380 |
| 3,421,276 | 1/1969 | Barge | 160/395 |
| 3,924,365 | 12/1975 | Orberg | 52/63 |
| 4,231,141 | 11/1980 | Derrick et al. | 160/380 X |
| 4,404,962 | 9/1983 | Zinn et al. | 52/222 X |
| 4,665,671 | 5/1987 | Sarvis | 52/273 X |
| 4,694,543 | 9/1987 | Conley | 52/63 X |
| 4,769,962 | 9/1988 | Pohl | 52/273 |
| 4,860,778 | 9/1989 | Pohl | 135/97 |
| 4,888,921 | 12/1989 | Markham | 52/63 |
| 4,935,995 | 6/1990 | Daus, Jr. | 160/392 X |

FOREIGN PATENT DOCUMENTS 3243525 5/1984 Fed. Rep. of Germany .......... 52/63

Primary Examiner—Richard E. Chilcot, Jr
Assistant Examiner—Kien Nguyen
Attorney, Agent, or Firm—Barnes, Kisselle, Raisch, Choate, Whittemore & Hulbert

[57] ABSTRACT

A barrier panel for enclosures and shield with a self-supporting framework of rigid tubes encompassing at least one through opening. The opening is enclosed by a cover sheet of flexible plastic film releasably secured to the framework by snap-on clips and a complementary retainer attached to a side face of the framework.

15 Claims, 3 Drawing Sheets

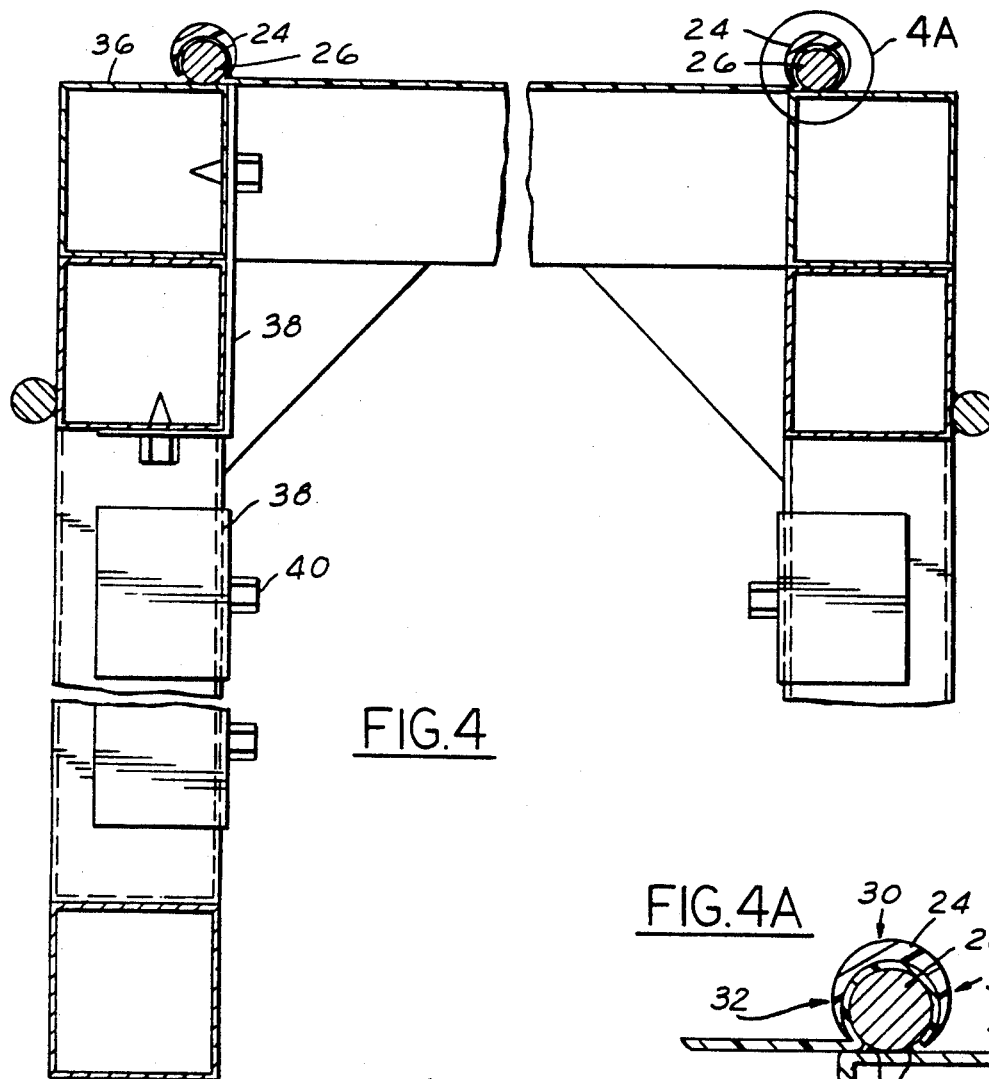
FIG.4
FIG.4A
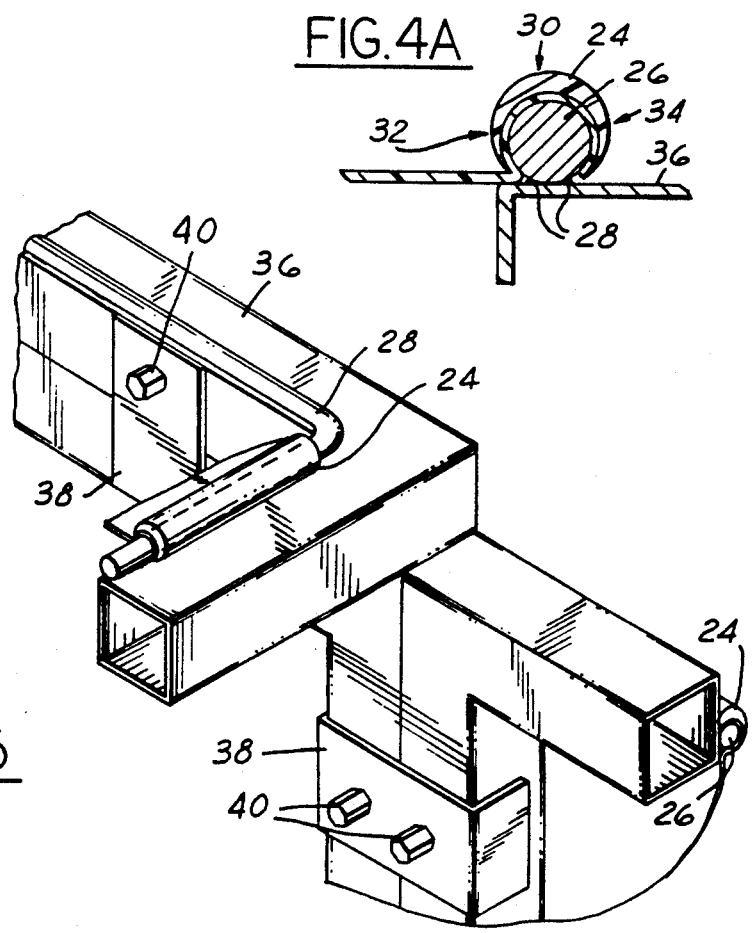
FIG.5

BARRIER PANEL

BACKGROUND OF THE INVENTION

1. Field of the Invention.

The invention relates generally to barriers and more particularly to modular panels for contaminant barriers capable of enclosing products and the like in manufacturing plants.

2. Background

In manufacturing facilities and production environments, it is common to protect products on conveyor systems from airborne contaminants in order to reduce product defects and increase quality. Paint and corrosion coating processes are two examples of applications for these structures.

To isolate the production facilities, an enclosure is often constructed to surround the work areas. These enclosures have a skeletal framework and a cover of a plastic film providing isolation from contaminants and dust which often become airborne. In order to facilitate frequent production line changes, these structures sometimes provide for modular assembly, consisting of inter-connecting component panels. However, the present way used to attach the plastic film to the surrounding framework decreases the structural properties of the load-bearing frame and makes it difficult to replace damaged cover sheets.

SUMMARY OF THE INVENTION

A panel with a self-supporting framework of a plurality of members encompassing at least one through opening, a cover sheet of a flexible material over the opening and releasably secured to the frame by complementary clip and bar retainer members which encompass the opening with one of the members attached to an exterior surface of the framework. Preferably, the frame members are metal tubes with a hollow and preferably rectangular cross section with a closed cell or integral walls providing optimum strength with minimum weight. Preferably, the cover sheet is a plastic film and the clamp members are complementary and axially elongate plastic clips which snap over metal retainer bars fixed to an exterior face of the framework.

A plurality of the panels can be used as modular building blocks to construct a contaminant barrier, shield, enclosure or other structure.

Objects, features and advantages of this invention are to provide a barrier panel which is lightweight, strong, self-supporting, rugged, durable, readily and easily packaged, shipped and stored in the flat, quickly and easily erected at the job site, easy to replace damaged cover sheets, and of simple design and easy and economical manufacture, assembly and erection.

BRIEF DESCRIPTION OF THE DRAWINGS

These and other objects and advantages of the invention will be apparent from the appended claims, following detailed description and accompanying drawings in which:

FIG. 4 is a cross sectional view taken generally on line 4—4 of FIG. 2;

FIG. 4A is a fragmentary and enlarged cross-sectional view of the encircled portion 4A of FIG. 4;

FIG. 5 is a partial perspective view showing a retainer clip and bar releasably securing the flexible cover sheet to the frame members, and a bracket connecting adjoining panels together.

WRITTEN DESCRIPTION

Figure 1:
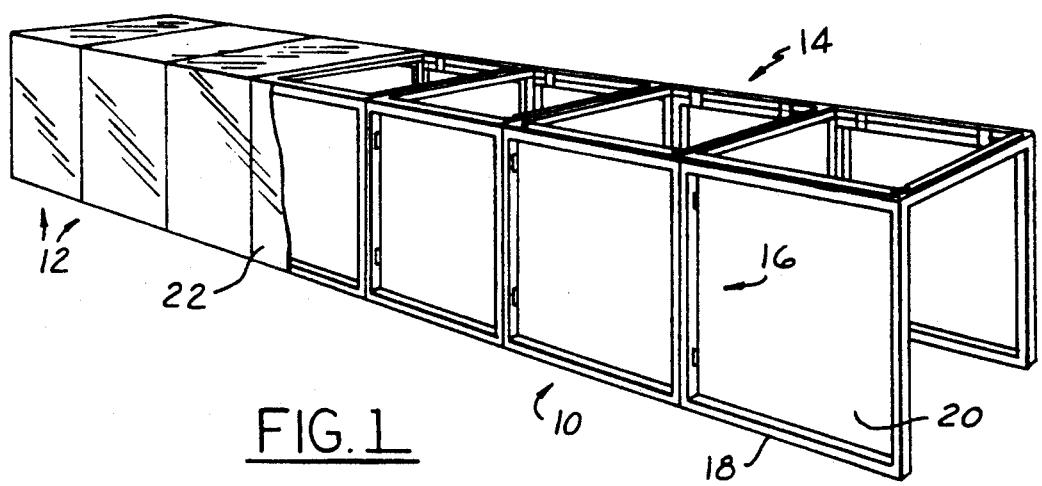
FIG. 1 is a perspective view of a contaminant barrier enclosure embodying the invention.

FIG. 1 illustrates a plurality of panels 10 embodying this invention in a modular assembly 12 of a contaminant barrier enclosure 14. The enclosure 14 provides a controlled environment that protects processing and manufacturing operations from exterior airborne contaminants. Three of the panels 10 can be connected together to form the sides and top of each of a plurality of the modular assemblies which are connected together to form the free standing and self-supporting enclosure 14. Usually, the panels are shipped, knocked down or in the flat and then assembled into the desired enclosure at the job site or location where the enclosure will be utilized.

Each panel 10 has a self-supporting framework 16 with frame rails 18 encompassing at least one through opening 20. The through opening 20 is enclosed by at least one cover sheet 22 of a flexible material such as a plastic film of ethylene vinyl acetate copolymer. Preferably, this plastic film is transparent, has a thickness of 4–10 mils and preferably 6–8 mils and is of a plastic material which if burned will not produce toxic products of combustion. While the framework 16 can have a wide variety of different configurations and sizes to suit a variety of applications, it is usually rectangular and often square. Preferably, to provide a high strength to weight ratio each rail 18 is a hollow tube of steel with a closed cell cross section with integral walls such as a 2" by 2" square cross section of #18 gauge galvanized steel tube.

Figure 2:
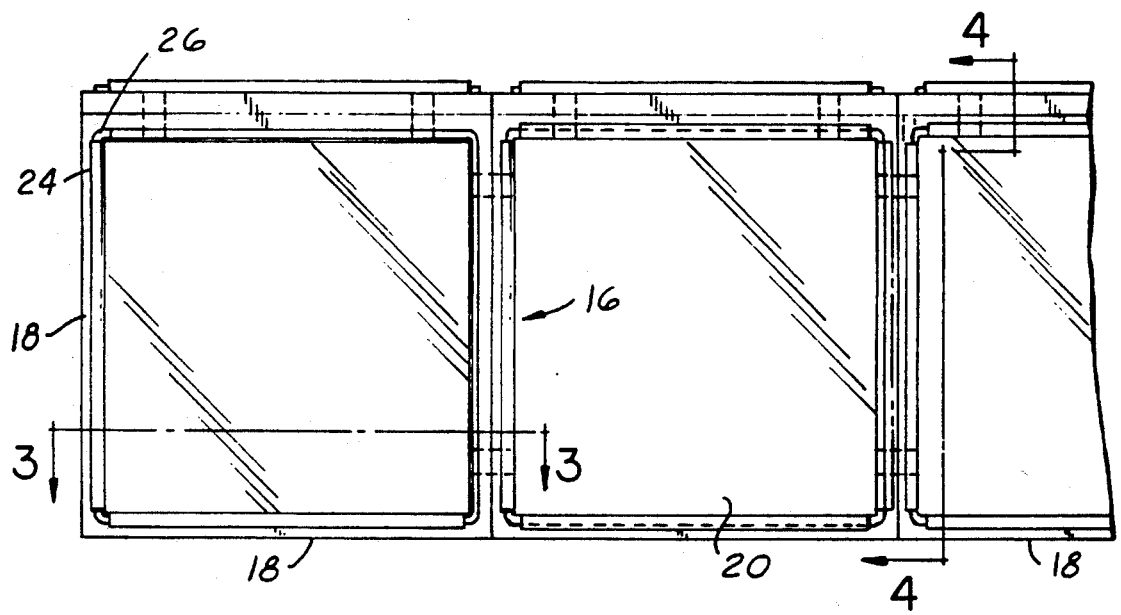
FIG. 2 is a fragmentary side view of the enclosure of FIG. 1.
Figure 3:
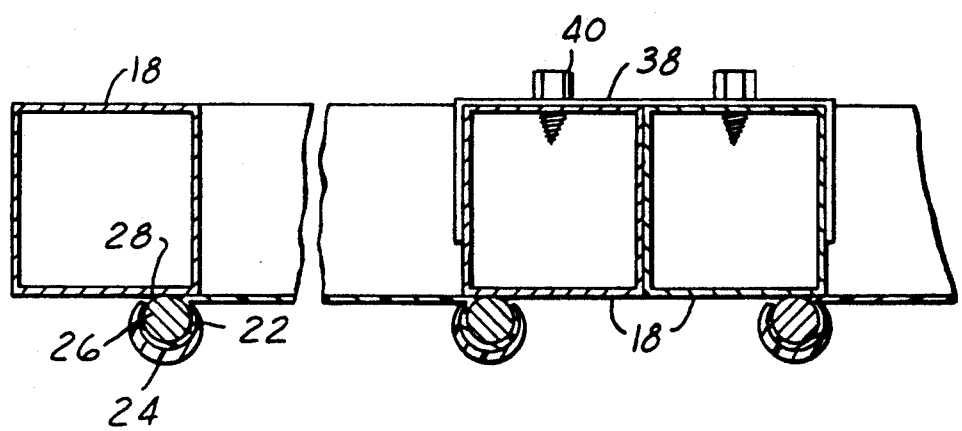
FIG. 3 is a cross sectional view taken generally on line 3—3 of FIG. 2.

In accordance with another feature of this invention, the cover sheet 22 is releasably secured to the framework by clips 24 received on complementary bars 26 attached, such as by weldments 28, to a side face of the framework. For some applications, it is preferable to secure the cover sheet to the outside face of the framework (as shown in the drawings) and for other applications to the inside face of the framework. The clips and bars are axially elongate and, as shown in FIG. 2, extend around the periphery of and encompass the through opening 20. As shown in FIGS. 3 and 4, preferably each bar is circular in cross section and can be either a solid rod or a hollow tube, such as a ½ diameter steel rod.

Preferably, each clip 24 is a resilient snap-on retainer which in cross section preferably has a crescent shape with its central portion 30 having a substantially greater thickness than its side edges or cusps 32 & 34. To insure that the clip will be firmly retained on the bar, in its relaxed or unflexed state, the distance between the side edges 32 and 34 of the clip is less than the diameter of the bar 26. For example, this distance between these edges is typically about 5/16 of an inch for a ½ inch diameter bar. Preferably, the strip is molded of a resilient plastic material, such as impact polypropylene or the like which if burned produces non-toxic products of combustion. Preferably, each clip extends axially along substantially the entire axial length of its associated bar to insure that the plastic cover sheet 22 is attached to the framework substantially throughout the entire periphery of the opening 20 enclosed by the cover sheet.

To maintain the integrity and strength of the tube rails 18 of the framework and to facilitate securing the cover sheet, the bars 26 are attached to an exterior surface of the rail, and preferably to a side face 36 of the framework, such as by spot welding. By not using the rails to form the means for releasably securing the cover sheet, the framework will have high strength, load carrying capacity and rigidity with a minimum weight for the amount of material utilized. Both initial attachment of the cover sheet to the framework and replacement of damaged cover sheets is facilitated by attaching the clamping bars on the exterior of the rails and preferably a side face of the framework. Furthermore, the strength and rigidity of the framework is increased by attaching the bars 26 to its side face.

The cover sheet is assembled to the framework by placing it over the opening 20 and stretching or pulling it taut over the bars 26 around the entire periphery of the opening. While the cover sheet is stretched or taut, the resilient clips 24 are snapped over the bars 26 to engage and firmly retain the cover sheet with its peripheral portion disposed between the bar and associated clip. As the clip is pushed over the bar its edges 32 and 34 are forced or camed outward and then snap over the bar to firmly retain the clip thereon with the cover sheet between them. Pushing the clip onto the bar also tends to further stretch or pull taut the cover sheet by forcing a portion of the underlying material to wrap around the bar. If desired, after the cover sheet of plastic film is secured to the framework, it can be heated, preferably by exposure to hot air, to heat shrink the film and thereby further tension or more tightly draw the cover sheet on the framework.

As shown in FIGS. 3-5, the edges of adjacent panels can be abutted and releasably connected together by a generally U-shape clip 38 which encompasses adjoining frame rails 18 and is preferably secured to them by fasteners 40, such as self-tapping screws.

Figure 6:
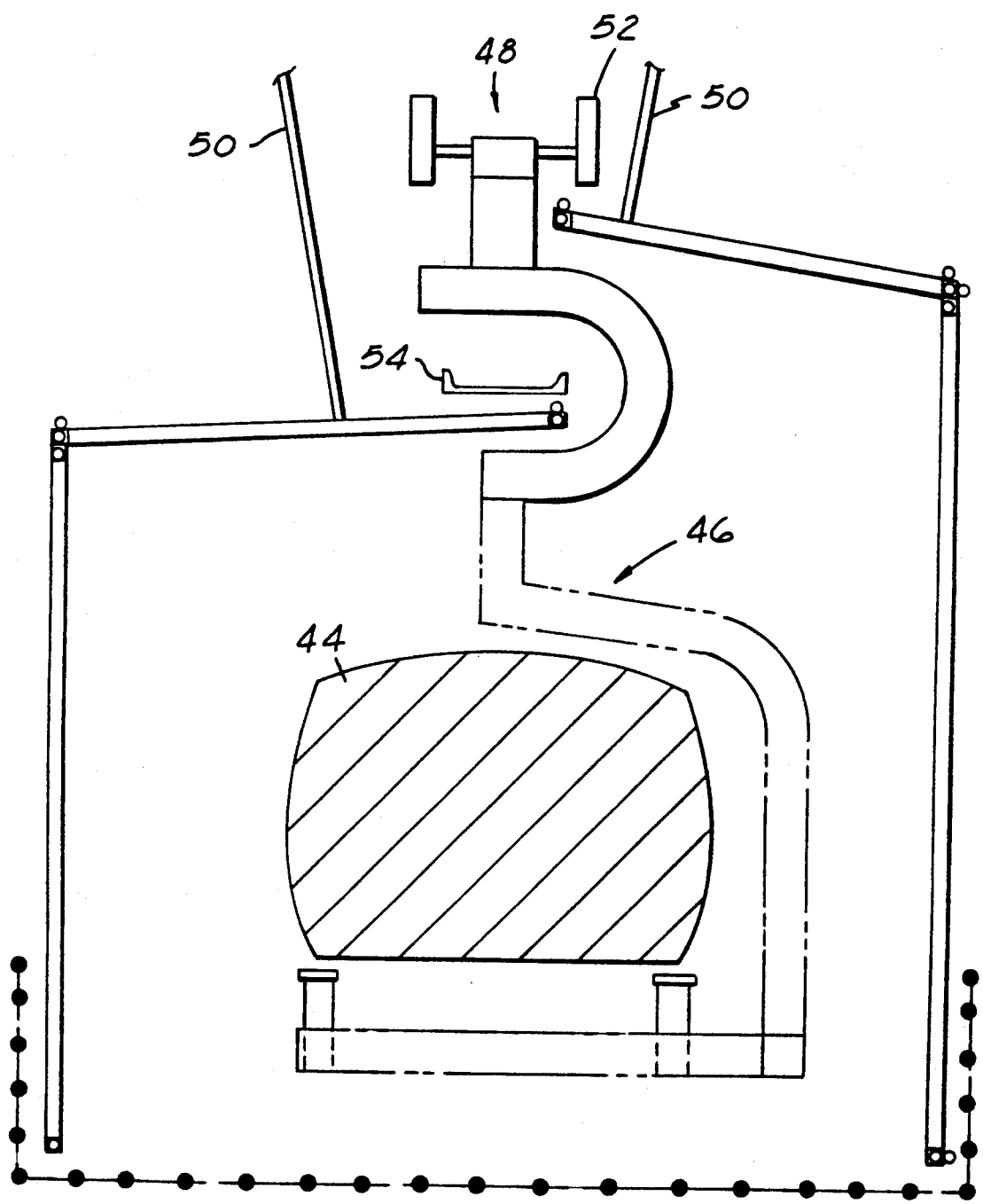
FIG. 6 is a cross sectional view of a typical section of another contaminant barrier structure enbodying the present invention.

As shown in FIG. 6, a plurality of panels can be assembled together to provide a shield or barrier 42 for a product, such as a car body 44 received on a hanger 46 and being carried by an overhead conveyer 48. The top panels are supported by struts 50 connected to the structure (not shown) supporting the overhead conveyor. While this shield does not totally enclose the car body, it does protect it from both airborne contaminants and contaminants, such as oil and grease, which may drop from the track and drive chain mechanism 52 of the overhead conveyor. If desired, a tray 54 can also be disposed under the conveyor track and above some of the panels to catch and retain at least some of the lubricant and other contaminants dropping from the conveyor mechanism.

I claim:

1. A barrier panel comprising: a self-supporting rigid framework with frame members encompassing at least one through opening, said frame members are hollow tubes with a closed cell generally rectangular cross section with an outer peripheral surface completely enclosing an inner surface, at least one pair of retainer and clip clamping members which are complementary, axially elongate, substantially encompass the through opening and can be releasably assembled with a cover sheet between them, one of the retainer and clip members being located on the exterior of the frame members and a side face of the framework, in cross section the periphery of said retainer being generally circular, said clip member being of plastic and somewhat resilient and in cross section having a generally C-shape with side edges spaced apart and terminating at a distance less than the outside diameter of said retainer member; and a cover sheet of a flexible material over the through opening and releasably secured to the framework by being received between the retainer and clip members.

2. A panel according to claim 1 wherein the retainer member is an elongate and hollow tube secured to a side face of the framework.

3. A panel according to claim 1 wherein the retainer member is secured to the framework.

4. A panel according to claim 1 wherein the retainer member is an elongate and solid rod secured to the framework.

5. A panel according to claim 1 wherein the opening is defined by a first pair of opposed frame members and a second pair of opposed frame members and the second pair of opposed frame members is substantially perpendicular to the first pair of opposed frame members.

6. A panel according to claim 1 wherein the cover sheet is a heat shrinkable plastic film drawn tight over the through opening by heat shrinking.

7. A panel according to claim 1 which also comprises means for securing a plurality of panels together to form a modular structure.

8. A panel according to claim 1 which also comprises an assembled shield for enclosing a product carried by a conveyor by securing a plurality of panels together.

9. A panel according to claim 1 wherein said clip members in cross section have a central portion with a substantially greater thickness than the thickness of the side edges of said clip members.

10. A panel according to claim 1 wherein each said clip is of a plastic material which, if burned, produces non-toxic products of combustion.

11. A panel according to claim 1 wherein said frame members are of steel, said retainer members are of steel, and said clip members are of a plastic which, if burned, produce non-toxic products of combustion.

12. A panel according to claim 11 wherein said cover sheet is a film of plastic material which, if burned, produces non-toxic products of combustion.

13. A panel according to claim 1 wherein said cover sheet is a film of plastic material which, if burned, produces non-toxic products of combustion.

14. A panel according to claim 1 wherein said cover sheet is a film of a plastic material having a nominal thickness in the range of 4 to 10 mils.

15. A panel according to claim 1 wherein said cover sheet is a film of ethylene vinyl acetate polymer and said clip members are impact polypropylene.

* * * * *